Feb. 2, 1932.   M. FINKELSTEIN   1,843,813
BACK COMB
Filed Dec. 10, 1929
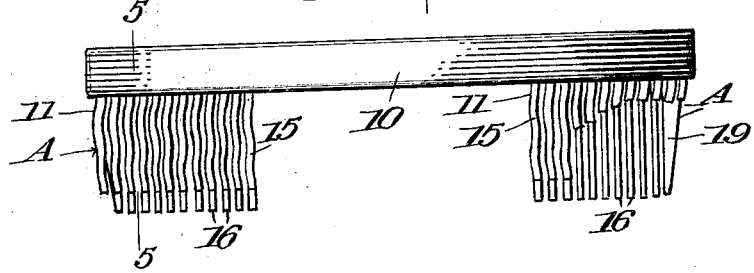
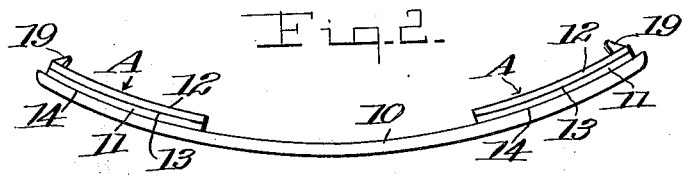
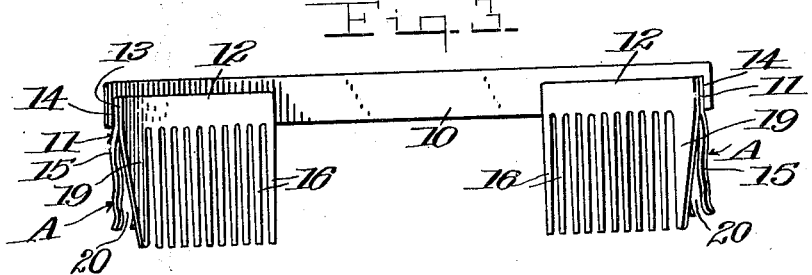
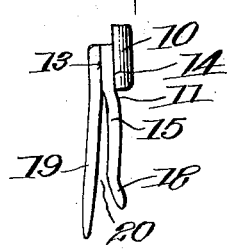 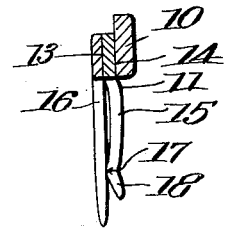

Patented Feb. 2, 1932

1,843,813

UNITED STATES PATENT OFFICE

MORRIS FINKELSTEIN, OF NEW YORK, N. Y.

BACK COMB

Application filed December 10, 1929. Serial No. 413,075.

This invention relates to a comb, particularly adapted for use as a back comb suited to the fashionable long bob, although useful with either long or ordinary bobbed hair.

It is primarily aimed to provide a novel construction which will securely grip the hair and remain in place.

Another object is to provide a construction consisting of a relatively stout bar by means of which the device may be handled and having at each end thereof, comb sections which will effectively grip the hair.

A further object is to provide a novel construction wherein the comb devices have tines arranged in a novel manner to facilitate insertion into the hair and retention therein.

Additional objects and advantages will become apparent from a consideration of the description following, taken in connection with accompanying drawings illustrating an operative embodiment.

In said drawings:—

Figure 1 is a view in front elevation, one of the comb sections being partly broken away to disclose details;

Figure 2 is a top or plan view of the device;

Figure 3 is a rear elevation of the device;

Figure 4 is an end view of the device and

Figure 5 is a vertical sectional view taken on the line 5—5 of Figure 1.

Referring specifically to the drawings, wherein like reference characters designate like or similar parts, 10 indicates a bar which is preferably arcuate in plan and made from celluloid or similar material.

At each end, bar 10 carries a comb device A. Each comb device comprises an outer comb member 11 and an inner comb member 12 which are in superposed relation, cemented together as at 13 and to the back of the bar 10 as at 14. Each of the comb members 11 and 12 is solid at the upper portion. Comb member 11 is provided with a series of locking tines 15 which coact with fastening tines 16 carried by the comb member 12. Such tines 15 and 16 are adapted to contact as shown in Figure 5, at 17 and from the zone of contact, the tines 15 diverge at 18 downwardly from the tines 16. In addition, the tines 15 are laterally sinuous as shown in Figure 1. Tines 16 also extend below the tines 15.

Since the comb members 11 and 12 are also made from celluloid or the like, when the comb members enter the hair through pressure applied on the bar 10, entry of the hair between the tines 15 and 16 is facilitated by the diverging portions 18 and the retention of the hair is assured by reason of the sinuosity of the tines 15 and their coaction with tines 16.

Attention is called to the fact that the outermost tine of each comb member 12, as designated 19, is heavier or stouter than the companion tines 16, so that the comb may, initially, be better forced into the hair. Also in order to obtain better initial engagement with the hair, such outermost tines 19 are, preferably, deflected rearwardly away from the adjacent end tine 15, so that the terminal tines will be spaced apart as shown at 20.

Particular attention is called to the fact, that the space 20 is wider than the spaces provided between tines 16 and deflected portions 18 of tines 15. This feature facilitates engagement of the device with the hair, especially if the device is applied in an angular position, since a quantity of the hair will first be received in space 20 and through the straightening of the comb, will be moved between the portions 18 and tines 16, after which the bar 10, while in substantially a horizontal position, may be pressed downwardly for reception of the hair between the tines above portions 17.

Various changes may be resorted to provided they fall within the spirit and scope of the invention.

I claim as my invention:—

1. An article of the class described, comprising a bar, comb devices attached to the bar at the rear thereof and in spaced relation, each comb device comprising a locking comb member fastened directly to the bar, a fastening comb member fastened to the locking comb member, the outermost tine of each fastening comb member being relatively thick and at its free end deflected rearwardly of the line of the free ends of the remaining tines.

2. A device of the class described, comprising a comb member having a plurality of tines, one end tine thereof being thicker than the remaining tines, a locking comb member superimposed on the first mentioned comb member, said locking comb member having locking tines coacting with the first mentioned tines and terminating above the lower ends thereof, the locking tines having terminal portions spaced from the retaining tines, and the device having a greater space between the outermost retaining tine and companion locking tine than between the remaining retaining and locking tines.

3. A device of the class described, comprising a comb member having a plurality of retaining tines, a comb member superimposed on the first mentioned comb member having locking tines coacting with the first mentioned tines, the outermost of the first mentioned tines being spaced at the lower end portion thereof from the adjacent locking tine for the purpose specified.

4. An article of the class described having fastening comb teeth adjacent each end thereof, locking comb teeth opposite said teeth, the outermost tooth at each end of said fastening teeth being deflected rearwardly of the line of the free ends of the remaining teeth.

5. An article of the class described having fastening comb teeth adjacent each end thereof, locking comb teeth superimposed on said first mentioned teeth, and the article having a greater space between the fastening teeth at each end thereof and the companion locking teeth than between the remaining fastening and locking teeth.

In testimony whereof I have affixed my signature.

MORRIS FINKELSTEIN.